Oct. 15, 1963    H. HANUSCH    3,107,057
PROCESS AND APPARATUS FOR THE PRODUCTION OF PARTS
FROM SYNTHETIC MATERIALS OF ANY KIND
REINFORCED WITH FIBRES

Filed Sept. 18, 1956    3 Sheets-Sheet 1

INVENTOR:
Hugo Hanusch
BY: *Michael S. Striker*
Agt.

3,107,057
PROCESS AND APPARATUS FOR THE PRODUCTION OF PARTS FROM SYNTHETIC MATERIALS OF ANY KIND REINFORCED WITH FIBRES
Hugo Hanusch, Cuxhaven-Duhnen, Germany, assignor to Cimex Trust, Vaduz, Liechtenstein, a company of Liechtenstein
Filed Sept. 18, 1956, Ser. No. 610,457
Claims priority, application Germany Sept. 28, 1955
6 Claims. (Cl. 239—336)

The methods hitherto known for the production of parts from synthetic materials reinforced with fibres require a considerable amount of working time. Particularly in the case of large parts, such as boats, tanks, containers and other bodies to be produced by the manual application process, using fabric mats, the wages are frequently so high that fibre-reinforced synthetic materials cannot be used, in spite of their good characteristics.

When producing parts using premoulded fibre calottes, the resin must penetrate the fibre moulded blank in the press. In so doing difficulties frequently arise in that either the fibre layer is not perfectly saturated with resin or the fibres are locally displaced and the strength of the part is reduced.

The present invention relates to a process and an apparatus for carrying out the same, with the aid of which fibre reinforced synthetic materials composed of resin components and cut fibres in individually determinable quantities, are sprayed onto mould parts or other surfaces. These parts can, according to the invention, be produced with an extremely high or low fibre content by the new spraying process. As binding medium for the fibrous materials all liquid and sprayable synthetic materials, such as polyester resins, melamine resins, ethoxyline resins, phenol resins and so forth can be used, and also any other cold or thermosetting binding agents.

The new process makes it possible to attain a considerable saving in working time as compared with the methods hitherto known. Moreover, it presents appreciable technical advantages in that a complete envelopment of the individual fibres with resin and a uniform distribution and density of the fibre-resin mixture are ensured.

The spraying equipment consists of a spraying gun to which a fibre cutting mechanism is coordinated which is either fitted directly on the gun or is separate therefrom and connected with the gun by a flexible tube. The fibre strands—rovings—are fed to the cutting mechanism and cut thereby into any adjustable length. The cut fibres thus produced are fed into the atomized resin and completely coated with resin. Colour pigments or other pigments can be added to the resin. It is advisable to make the resin thixotropic and for this purpose silicon dioxide is mixed therewith. According to the purpose for which the part to be produced is intended, the fibres can be obtained from mineral melts, such as glass, basalt, slags and the like, or chemically produced materials, such as, for example, nylon, perlon and so forth. Thin metallic threads can also be cut and sprayed.

Apparatus for carrying out the process according to the invention is illustrated by way of example in the accompanying drawings, in which.

Figure 1:
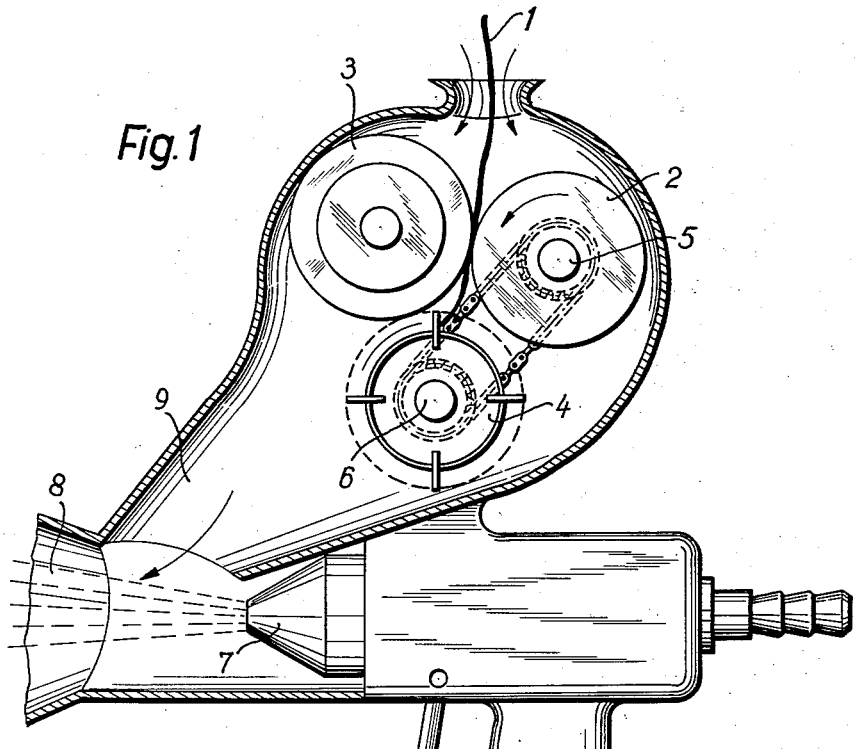
FIG. 1 shows a spraying arrangement in which the cutting mechanism forms a complete unit with the spraying gun.

In the spraying arrangement illustrated in FIG. 1, in which the cutting mechanism is made in one piece with the spraying gun, the fibre strand 1 runs from a roving to the cutting mechanism and is guided by rollers 2 and 3 to a roller 4 in which blades are fitted. The shaft 5 of the roller 2 is driven either directly by an adjustable geared motor or through the intermediary of a flexible shaft. The shaft 5 carries at its other end a sprocket wheel or a gear and drives the shaft 6 of the blade roller 4.

The nozzle 7 atomizes the resin fed under pressure with which the cut fibres coming from the cutting mechanism converge in the mixing chamber 8 and intimately mix. A strong jet of resin and compressed air passing through the nozzle causes a vacuum in the chamber 9 and the air current produced thereby carries with it the cut fibres and conducts them into the mixing chamber 8.

Figure 2:
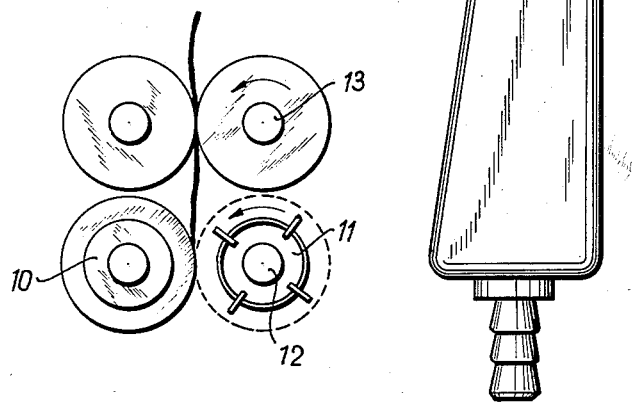
FIG. 2 is a modification of the cutting mechanism illustrated in FIG. 1.

In FIG. 2 the cutting mechanism has four instead of three rollers. The roller 10 engaged by the rotating set of blades is coated with wear-resisting synthetic material. The shaft 12 of the blade roller and the shaft 13 of the upper feed roller are independently driven. The quantity of fibres fed is determined by adjusting the speed of the shaft 13 and the length of the fibre by adjusting the speed of the shaft 12.

Figure 3:
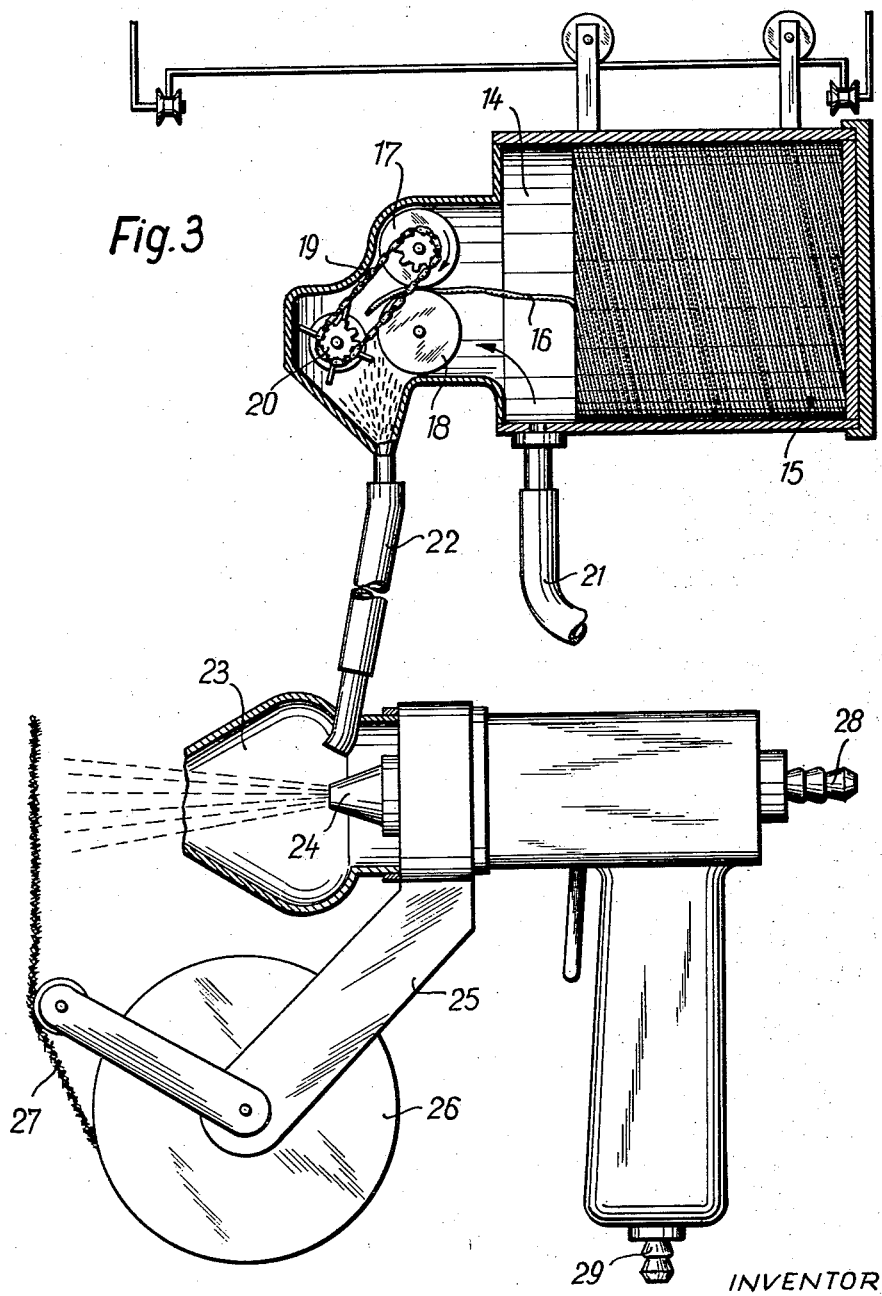
FIG. 3 shows a spraying plant for large outputs.

A spraying plant for large outputs is shown in FIG. 3. The closed housing of the fibre cutting mechanism 14 carries the roving 15 from which the fibre strand 16 is guided to the feed rollers 17 and 18. The roller 17 is driven by a motor and drives the roller 20 fitted with blades through the intermediary of a chain 19. Compressed air is conducted through the flexible tube conduit 21 into the chamber 14 of the fibre cutting mechanism. This air current guides the cut fibres through the flexible tube conduit 22 into the mixing chamber 23 of the spraying gun. Here the fibres are intimately mixed with the resin atomized by the nozzle 24, and sprayed.

The gun is fitted with a bobbin carrier 25 which carries a bobbin 26 and can be turned about the gun neck and fixed in any desired position. The fibre strands or bands 27 taken from the bobbin 26 can thus be brought into any desired direction as additional reinforcements and are embedded in the fibre-resin mixture. The resin is fed to the gun through the connecting piece 28 and the necessary atomizing air through the connecting piece 29.

The air flowing through the fibre cutting mechanism 14 can be passed over an air heater and heated. In this manner the polymerization or setting of the resin or binding medium can be accelerated. Even in the case of unfavorable moisture conditions in the air, electro-static charges resulting therefrom can be avoided. It is generally advisable to make the flexible tube 22 of synthetic material such as polyamide or polyvinyl chloride with electricity conductors, such as graphite or metal dust, mixed therein.

Figure 4:
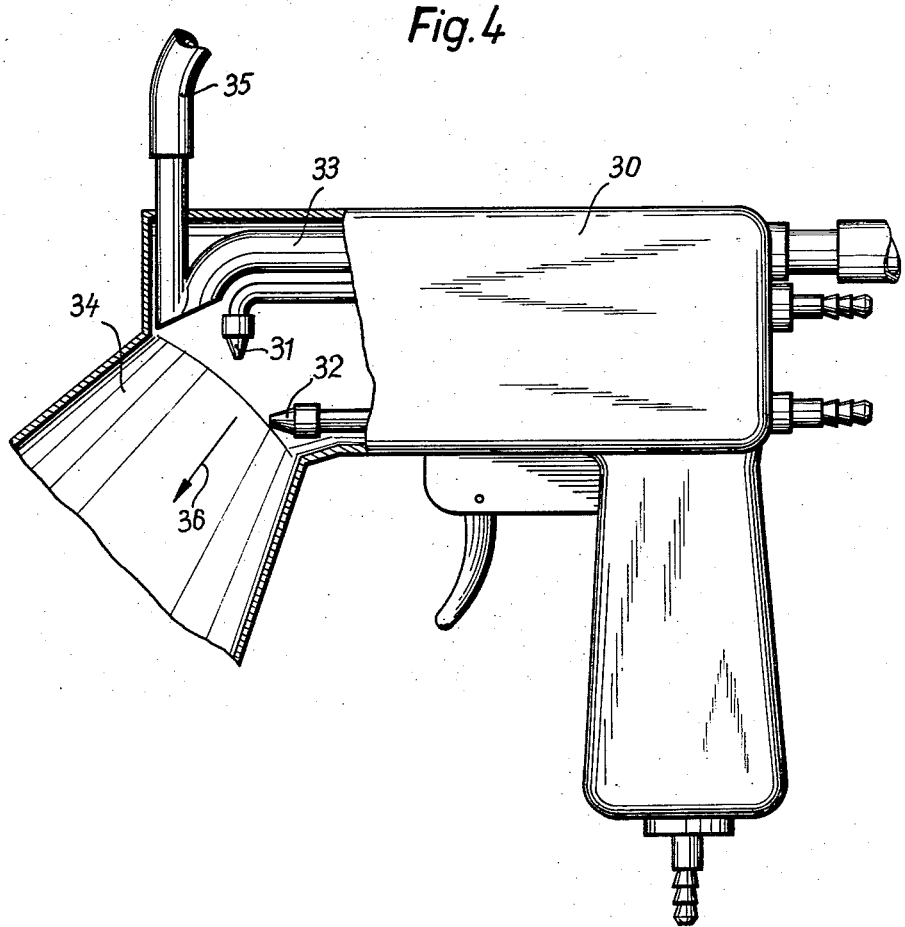
FIG. 4 shows a spraying gun equipped for spraying several resin components, cut threads and, if desired, also filling ingredients.

According to the invention, several resin components, cut fibres and, if desired, also filling ingredients can be sprayed. A gun for this purpose is illustrated in FIG. 4.

The gun 30 is provided with atomizer nozzles 31 and 32 located at the inlet of a tubular passage 34. A resin mixed with a catalyst and, if desired, also with pigments, is fed to one of these nozzles whereas a resin containing setting or accelerating agents is fed to the other nozzle so that the sprayed atomized resin materials form an atomized mixture in the passage 34 which acts as a mixing chamber. The nozzles are at right angles to each other. A stream of air carrying cut fibres fed from the fibre cutting mechanism passes through the conduit 33 into the inlet of the mixing chamber 34. At the same time filling ingredients are fed through the conduit 35. All the components are thoroughly intermixed in the chamber 34 and pass in the direction of the arrow through the tubular passage 34 before setting. A gun of this type is operated by hand but in the case of the mass-production of parts it can be arranged stationary and operated fully automatically on the known basic principles of regulation and control technique. In any case it is possible to spray selectively only one of the components or to intermix these in certain proportions. If the gun is provided with an additional resin nozzle, parts with particularly smooth and clean surface can be produced by first spraying a fibre-free resin mixture onto or into the mould and only then applying a mixture containing fibres.

As filler ingredient mineral substances, such as finely ground quartz or asbestos fibres or vegetable substances, such as cotton linters, powdered cork or wood dust can be used.

I claim:

1. A method of forming a fiber reinforced plastic article comprising the steps of directing two atomized sprays of two atomized liquid synthetic settable materials at each other in the inlet of a tubular passage adapted to be manually aimed, whereby a mixture of said atomized materials is formed in said passage; and introducing into the inlet of said tubular passage and into said atomized mixture a stream of air and fibers so that an organized stream of air, atomized mixture and fibers coated in said passage with said mixture passes out of said passage before said mixture sets whereby an object at which said passage is manually aimed is coated with said mixture reinforced by said fibers.

2. A method of forming a fiber reinforced plastic article comprising the steps of directing two atomized sprays of two atomized liquid synthetic materials at each other in the inlet of a tubular passage adapted to be manually aimed, one of said liquid materials including a resin and a catalyst, and the other liquid material containing a resin and an accelerator whereby a quick setting atomized mixture of said materials is formed in said passage; and introducing into the inlet of said tubular passage and into said atomized mixture a stream of air and fibers so that an organized stream of air, atomized mixture, and fibers coated in said passage before said mixture sets with said mixture passes out of said passage whereby an object at which said passage is manually aimed is coated with said mixture reinforced by said fibers.

3. A hand operated spraying apparatus comprising, in combination, a housing including a tubular passage means having an inlet and an outlet; a handle means secured to said housing for manually aiming said tubular passage means; a pair of spraying atomizer nozzles located adjacent each other in said housing adjacent said inlet and being transversely directed with respect to each other for spraying convergent sprays of two different atomized liquid synthetic materials into said passage means so that an atomized mixture of said atomized materials is formed in said passage means; supply means attached to said housing and connected to said nozzles, for supplying to the same air and said materials, respectively; and conduit means connected to and opening into said housing adjacent said inlet and said atomizer nozzles for introducing into said tubular passage and thereby into said atomized mixture a stream of air and fibers so that an organized stream of air, atomized mixture, and fibers coated with said mixture in said passage means, passes out of said outlet whereby an object at which said passage means is manually aimed, is coated with said mixture reinforced by said fibers.

4. A spraying apparatus comprising, in combination, a housing including a tubular passage having an inlet and an outlet; means secured to said housing for aiming said tubular passage means at an object; two spraying atomizer nozzles located in said housing adjacent said inlet for spraying two sprays of atomized liquid materials into said tubular passage means so that an atomized mixture of said atomized materials is formed in said passage; supply means attached to said housing and connected to said nozzles for supplying to the same air and said materials; and means for introducing through said inlet into said tubular passage and thereby into said atomized mixture a stream of air and fibers so that a stream of air, atomized mixture and fibers coated in said passage means with said atomized mixture, passes out of said outlet whereby an object at which said passage means is aimed is coated with a mixture of said materials reinforced by said fibers.

5. A spraying apparatus comprising, in combination, a housing including a tubular passage having an inlet and an outlet; means secured to said housing for aiming said tubular passage means at an object; two spraying atomizer nozzles located in said housing adjacent said inlet for spraying two sprays of atomized liquid materials into said tubular passage means so that an atomized mixture of said atomized materials is formed in said passage; supply means attached to said housing and connected to said nozzles for supplying to the same air and said materials; means for introducing through said inlet into said tubular passage and thereby into said atomized mixture a stream of air and fibers and including a conduit means having an end portion located in the region of said inlet of said tubular passage and extending substantially in the direction of the same whereby a stream of air and fibers flows into said tubular passage so that a stream of air, atomized mixture and fibers coated in said passage means with said atomized mixture, passes out of said outlet whereby an object at which said passage is aimed is coated with a mixture of said materials reinforced by said fibers; and means for supplying into said housing particles of a filler material and including another conduit means opening into said housing in the region of said inlet of said tubular passage adjacent said means for introducing said stream whereby said particles are taken along by said stream and are coated with said atomized mixture in said tubular passage means.

6. A spraying apparatus comprising, in combination, a portable first housing including a tubular passage having an inlet and an outlet at the free end thereof; two spraying atomizer nozzles located in said first housing adjacent said inlet for spraying sprays of two atomized liquid synthetic materials into said tubular passage so that an atomized mixture of said atomized materials is formed in said passage; supply means attached to said first housing and connected to said atomizer nozzles for supplying air and said materials to the same; means on said first housing for manually aiming the same and said tubular passage at an object to be sprayed; a second housing spaced from said portable first housing; support means for supporting said second housing on the ground; a flexible conduit means having one end connected with said first housing, and having the other end thereof connected to and opening into said second housing, said conduit means having at said one end an end portion located in said first housing in the region of said nozzles and of said inlet of said tubular passage and extending substantially in the direction of said tubular passage; cutter means mounted in the second housing in the region of said conduit means; feeding means mounted in said second housing for feeding a roving to said cutter means so that said cutter means cuts said roving into fibers; means connected to said second housing for supplying air under pressure to the same so that a stream of air passes past said cutter means and through said conduit means into said first housing and carries cut fibers into said first housing and into the atomized mixture produced by said nozzles so that a stream of air, atomized mixture and fibers coated with said atomized mixture in said passage passes out of said outlet whereby an object at which said passage is aimed is coated with a mixture of said materials reinforced by said fibers.

References Cited in the file of this patent

UNITED STATES PATENTS

| | | |
|---|---|---|
| 1,251,753 | Comins | Jan. 1, 1918 |
| 1,617,166 | Schoop | Feb. 8, 1927 |

(Other references on following page)

UNITED STATES PATENTS

| | | | |
|---|---|---|---|
| 1,718,507 | Wenzel et al. | June 25, 1929 |
| 2,152,901 | Manning | Apr. 4, 1939 |
| 2,217,538 | Carson | Oct. 8, 1940 |
| 2,411,559 | Sonin et al. | Nov. 26, 1946 |
| 2,528,168 | Paulsen | Oct. 31, 1950 |
| 2,571,334 | Browne | Oct. 16, 1951 |
| 2,653,355 | Essman | Sept. 29, 1953 |
| 2,662,044 | Morrison et al. | Dec. 8, 1953 |
| 2,702,261 | Bacon et al. | Feb. 15, 1955 |
| 2,758,952 | Toulmin | Aug. 14, 1956 |
| 2,787,314 | Anderson | Apr. 2, 1957 |
| 2,850,421 | Thompson | Sept. 2, 1958 |

FOREIGN PATENTS

| | | |
|---|---|---|
| 439,476 | Great Britain | Dec. 6, 1935 |